United States Patent [19]

Arndt

[11] Patent Number: 5,372,397
[45] Date of Patent: Dec. 13, 1994

[54] SELF-POSITIONING TAILGATE COVER

[75] Inventor: Ronald C. Arndt, Montello, Wis.

[73] Assignee: Penda Corporation, Portage, Wis.

[21] Appl. No.: 132,755

[22] Filed: Oct. 6, 1993

[51] Int. Cl.5 ............................................. B60R 13/01
[52] U.S. Cl. .................................. 296/39.2; 296/57.1
[58] Field of Search ........................ 296/39.1, 39.2, 50, 296/57.1, 901; 224/42.42

[56] References Cited

U.S. PATENT DOCUMENTS

| | | | |
|---|---|---|---|
| 2,075,689 | 3/1937 | Zinser | 45/138 |
| 4,111,481 | 9/1978 | Nix et al. | 296/39 |
| 4,333,678 | 6/1982 | Munoz et al. | 296/39 |
| 4,341,412 | 7/1982 | Wayne | 296/39.2 |
| 4,572,568 | 2/1986 | Kapp et al. | 296/39.2 |
| 4,607,877 | 8/1986 | Shelton | 296/191 |
| 4,707,016 | 11/1987 | McDonald | 296/39 |
| 4,875,731 | 10/1989 | Ruiz | 296/39.2 X |
| 4,936,625 | 6/1990 | Pickard et al. | 296/39 |
| 4,986,590 | 1/1991 | Patti et al. | 296/39 |
| 5,000,503 | 3/1991 | Bernatek | 296/39.2 |
| 5,169,201 | 12/1992 | Gower | 296/39 |

Primary Examiner—Dean J. Kramer
Attorney, Agent, or Firm—Lathrop & Clark

[57] ABSTRACT

A thermoformed thermoplastic panel has three V-shaped protrusions which extend into engagement with the ramped depressions within a truck tailgate to automatically align the upper edge of the panel with the rail cap of the tailgate. The panel forms a protective cover for the tailgate and is held in place by screws having large, wide, flat heads which overlie the upper surface of the cover. The screws have shanks which have a nonthreaded portion adjacent to the head and a tapered, threaded portion at the end. The screws are tightened to bring the tailgate cover upper edge adjacent to the tailgate cap.

7 Claims, 3 Drawing Sheets

SELF-POSITIONING TAILGATE COVER

FIELD OF THE INVENTION

This invention relates to liners for truck beds in general, and to liners for truck bed tailgates in particular.

BACKGROUND OF THE INVENTION

Tailgate covers are commonly used with truck bed liners to protect and improve the appearance of the cargo area of a pick-up truck. With the advent of the light truck as the second family car, the appearance of trucks has had to meet new standards imposed by these new consumers.

One appearance item finding its way onto more and more pick-up trucks is a tailgate rail cap which overlies the upper edge of a tailgate. This has given rise to a problem in designing a tailgate cover. Tailgate covers, in a way similar to truck bed liners, typically employ vacuum thermoformed, high density polyethylene in their construction. Typically, the polyethylene material is black. Although polyethylene can be made in a wide variety of colors, black imparts a high resistance to ultraviolet breakdown of the plastic caused by exposure to sunlight. Black also tends to hide the soil and is appearance-compatible with a wide range of truck paint schemes.

A problem arises when a black tailgate cover is utilized on a truck tailgate which has a rail cap. If the tailgate cover does not abut closely with the tailgate cap, a gap between the tailgate cap and the cover may be left which may visually produce a line of discordant color between tailgate cap and the tailgate cover. Such a gap presents an appearance of poor fit and finish which is highly undesirable.

One known solution to this problem is to provide the truck with a specially designed tailgate cap which has a sleeve into which the upper edge of a tailgate cover may be received. However, such a specialized tailgate cap presents a discordant appearance when not used with a tailgate cover. Furthermore, such a cap must be supplied as manufacturer's original equipment, or alternatively must be used to replace a manufacturer's original equipment cap. In the first case the cover may not be used with a wide range of trucks, and in the second case a user is required to remove and dispose of the original equipment cap.

What is needed is a tailgate cover with features that assure alignment with the tailgate cap to prevent unsightly gaps therebetween.

SUMMARY OF THE INVENTION

The tailgate cover of the present invention is a thermoformed thermoplastic panel which is fastened by screws to a truck tailgate. The plastic panel has at least one molded ramp formed therein which engages with a longitudinally extending depression found on the tail gate. Tightening of the screw fasteners not only brings the panel closer to the tailgate surface, it also causes the molded ramp to engage against the tailgate depression, also inclined, and to drive the upper edge of the cover into close engagement with the lower edge of the tailgate rail cap.

The tailgate cover is held to the tailgate by four sets of two screws which pass through holes in the tailgate cover and are screwed into the underlying sheet metal of the truck tailgate. The screws have large, wide, flat heads which overlie the upper surface of the tailgate cover. The screws have shanks which have a non-threaded portion adjacent to the head and a tapered, threaded portion at the end. The non-threaded portion has a diameter which is at least as large as the diameter of the threaded portion. The threaded portion is similar to the threads of a sheet metal screw with sharp, narrow threads with deep flat roots.

It is an object of the present invention to provide a self-aligning tailgate cover.

It is also an object of the present invention to provide a tailgate cover of improved appearance when assembled to a tailgate.

It is another object of the present invention to provide a tailgate cover which may be positioned beneath a tailgate cap without significant gaps therebetween.

Further objects, features and advantages of the invention will be apparent from the following detailed description when taken in conjunction with the accompanying drawings.

DESCRIPTION OF THE PREFERRED EMBODIMENT

Figure 1:
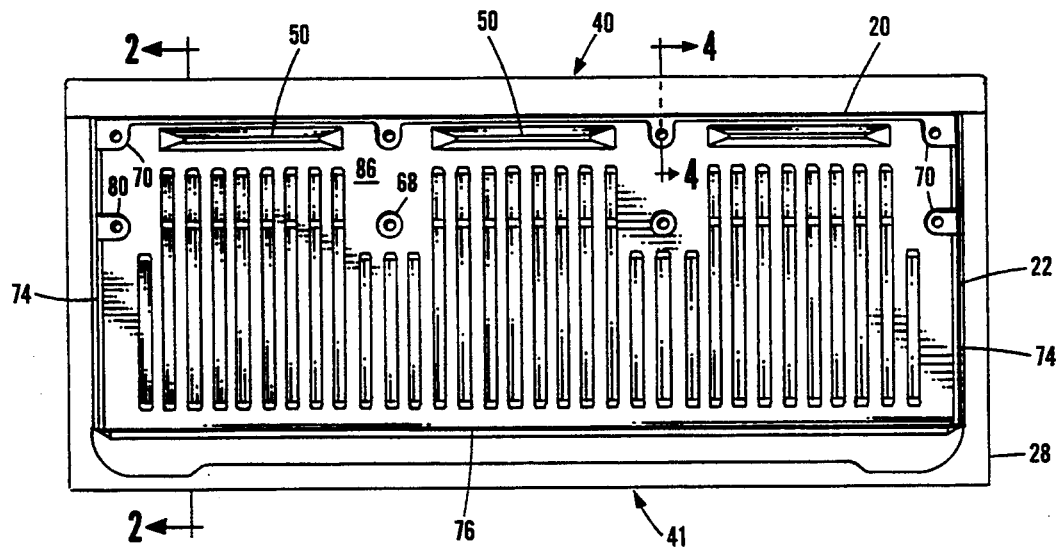
FIG. 1 is an truck interior side elevational view of the tailgate cover of this invention positioned on a truck tailgate.
Figure 2:
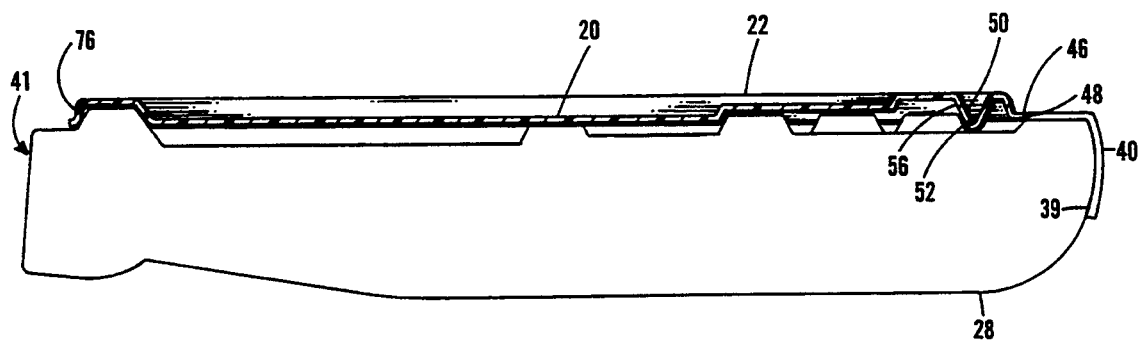
FIG. 2 is a cross-sectional view of the tailgate cover of FIG. 1 on the tailgate on which it is positioned, taken along section line 2—2.
Figure 3:
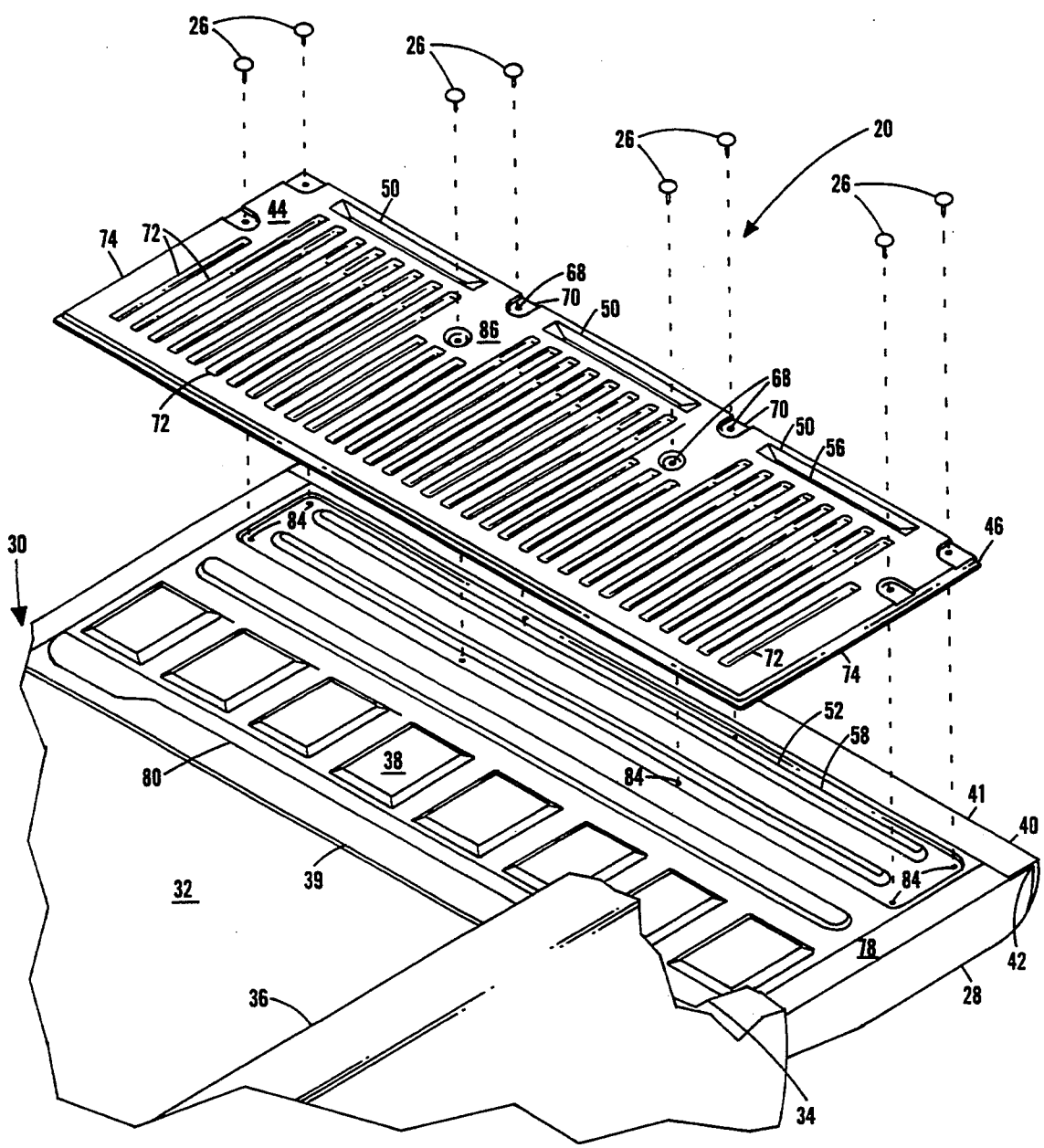
FIG. 3 is an exploded isometric view, partly cut away, of the cover of FIG. 1 shown in relation to the rear of a truck tailgate and bed.

Referring more particularly to FIGS. 1-7, wherein like numbers refer to similar parts, the tailgate cover 20 is shown in FIGS. 1 and 3. As shown in FIG. 3, the tailgate cover 20 is composed of a unitary thermoformed thermoplastic liner panel 22 which is joined by screws 26 to the tailgate 28 of a pick-up truck 30. The floor 32 and sidewalls 34 together with the tailgate 28 and the box front (not shown) of a pick-up truck 30 define a pick-up box 36. The interior surface 38 of the tailgate when upright forms a part of the box 36 which faces inwardly and is normally subject to wear and abrasion unless protected by some covering.

The plastic panel 22, although smaller overall than the entire tailgate 28, corresponds substantially in area to that of the inner tailgate surface 38 and overlies the surface 38. The inwardly-facing surface 38 may engage against and support loads carried on the truck bed. The inwardly facing tailgate surface 38 extends between an upper tailgate surface 39, which extends outwardly from the inwardly-facing surface and which defines the upper portion of the tailgate upper rail 42; and the lower tailgate surface 41 which engages against the truck floor 32 when the tailgate is upright.

The surface 38 may be required to bear loads both when the tailgate is upright and when it is down. When the tailgate is down, the materials being loaded into the truck box 38 often are slid over the tailgate surface 38. When long loads arc carried, they often extend past the floor 32 onto the tailgate 28. Furthermore, when the tailgate 28 is in the upright position, the inwardly-facing tailgate surface 38 serves to restrain cargo on the floor 32 of the truck box 36 from sliding out of the truck 30.

As shown in FIGS. 1-4, the tailgate cover 20 is designed to function with a tailgate rail cap 40. Many truck manufacturers provide protective and decorative rail caps 40 as original equipment. The rail cap 40 is typically formed of a plastic material or metal and serves to cover the upper surface 39 of the tailgate, providing design continuity with other trim pieces and rail caps elsewhere on the truck. The tailgate rail cap 40 covers the tailgate rail 42 and is often of a contrasting color to the tailgate paint scheme. The tailgate cover 20, on the other hand, is normally constructed of vacuum thermoformed high-density polyethylene. Though high-density polyethylene can be made in a wide variety of colors, liners for truck beds arc normally colored black by finely dispersed carbon particles. The dispersed black coloring imparts a high resistance to ultraviolet breakdown by preventing ultraviolet rays from penetrating the exposed surface 44 of the tailgate cover 20. Black color coloring also tends to hide soil and its appearance is compatible with a wide range of truck paint schemes. Thus, although the cover 20 and the tailgate rail cap 40 may be of the same color, the cover 20 will rarely conform in color to the paint scheme of the truck 30.

To prevent an unsightly stripe of truck paint showing through between the rail cap 40 and the cover 20, it is important that no gap develop between the upper edge 46 of the panel and the lower edge 48 of the tailgate rail cap 40. The tailgate cover 20 has three V-shaped grooves 50 formed into the panel 22. The grooves 50 are located beneath the liner panel upper edge 46 and project outwardly from the panel toward the tailgate surface 38. Each groove 50 has an ramped sidewall 56 which is inclined toward the rail cap lower edge 48. The grooves are positioned to engage within depressions 52 which are present in the sheet metal which defines the tailgate surface 38. Typically, a tailgate has a plurality of protruding ribs 60 which project upwardly from within the depressions 52. The ribs 60 have upwardly facing inclined sidewalls 58 which taper toward the rail cap lower edge 48. The three grooves 50 of the liner panel 22 are aligned with one another, hence the ramped sidewalls 56 of the grooves engage with the ramped sidewall 58 of a single rib 60 or a plurality of aligned ribs. The inclination of the sidewalls 56 of the panel 22 and the sidewall 56 of the tailgate rib 60 may be equivalent, or the degree of ramping may be different in each.

Figure 4:
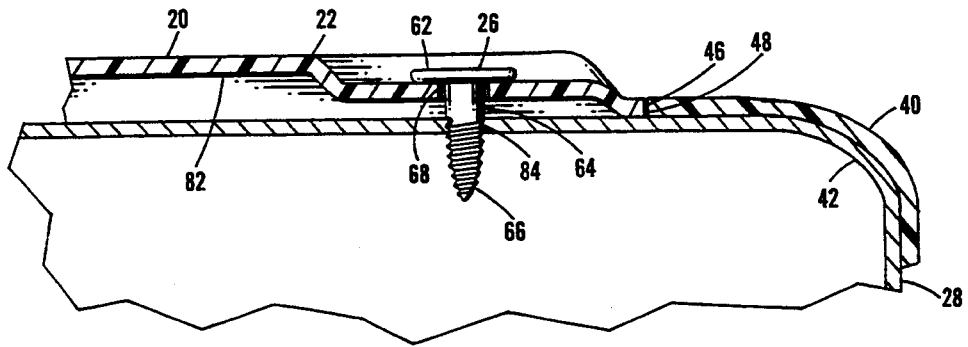
FIG. 4 is a fragmentary cross-sectional view of the tailgate cover of FIG. 1 taken along section line 4—4 of a tailgate showing in detail a fastener used to install the cover.

Sheet metal fasteners 26, best shown in FIG. 4, attach the liner panel 22 to the tailgate 28. The fasteners 26 have a wide, flat head 62 which is connected to an untapped shank 64, which in turn is joined to a tapered threaded portion 66. The fasteners 26 pass through holes 68 formed in the liner panel 22. The holes are formed in recessed portions of the liner panel 22 located between the V-shaped grooves 50 and aligned with the grooves, and also spaced downwardly from the grooves 50. The holes 68 are larger in diameter than the shanks 64 of the fasteners 26.

Figure 5:
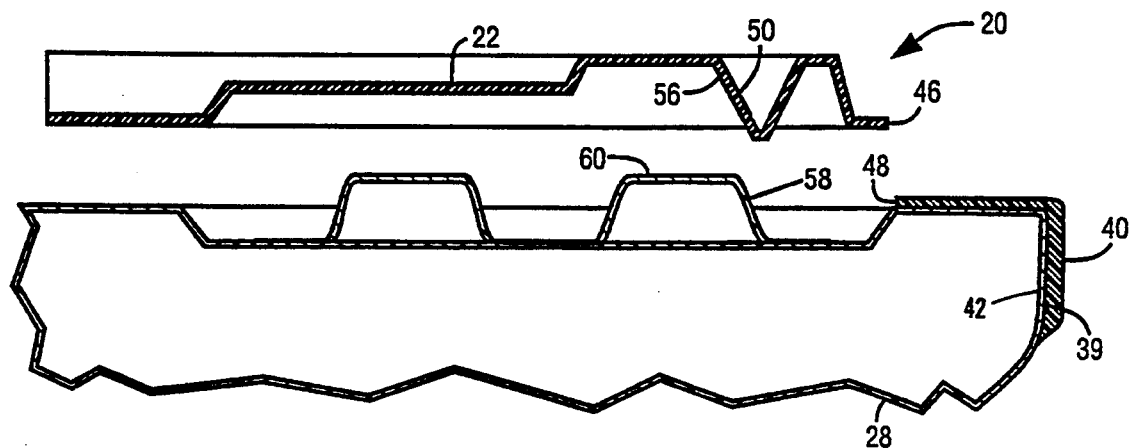
FIG. 5 is a cross-sectional view of the tailgate cover in position over the tailgate of FIG. 1 before assembly.
Figure 6:
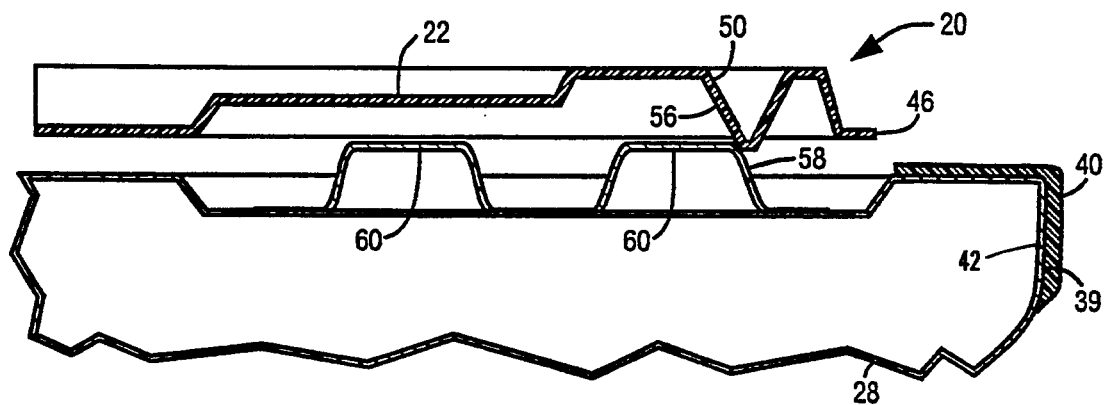
FIG. 6 is a cross-sectional view of the tailgate of FIG. 5 engaged with the tailgate.
Figure 7:
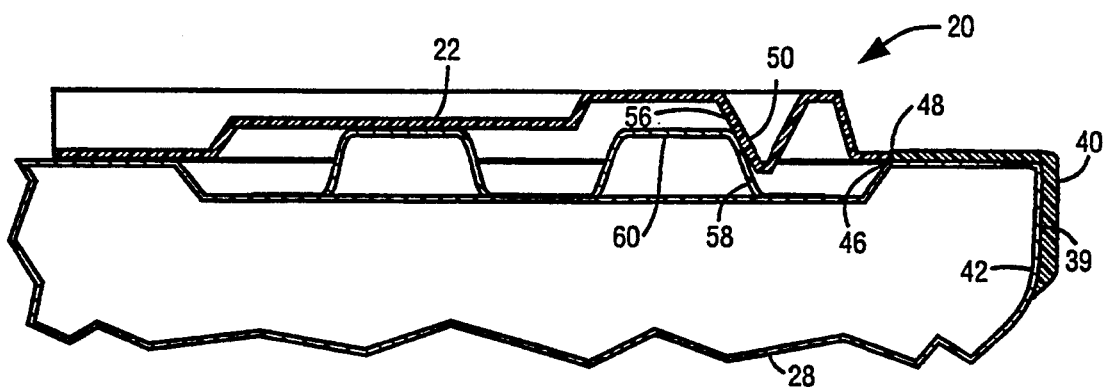
FIG. 7 is a cross-sectional view of the tailgate cover of FIG. 6 as assembled to the tailgate to remove the gap therebetween.

Installation of the cover 20 on a conventional tailgate 28 is illustrated in FIGS. 5-7. The liner panel is first positioned to overlie the inwardly-facing surface 38 of the tailgate 28, beneath the rail cap 40, as shown in FIG. 5. As the liner panel 22 is lowered into engagement with the tailgate surface 38, as shown in FIG. 6, the inclined sidewalls 56 of the V-shaped grooves 50 engage with the inclined sidewall 58 of a rib 60 within a depression 52 in the tailgate 28. As the fasteners 26 are screwed into position through the holes 68, the liner panel groove inclined sidewall 56, which is in constant engagement with the inclined sidewall 58 of a rib in the tailgate 28, moves outwardly toward the tailgate surface 38, and at the same time moves upwardly toward the tailgate rail cap 40. As shown in FIG. 7, the fasteners 26 are tightened sufficiently to advance the liner panel upper edge 46 into abutment with the rail cap lower edge 48.

The cover 20 of this invention may thus be installed on a variety of vehicles without the need to custom fabricate the liner panel 22 to take into account the precise location and tolerances of a particular rail cap. The degree to which the fasteners are tightened will insure that the cover 20 is properly positioned for a particular vehicle, without the need for measuring or in anyway modifying the structure of the cover 20.

For additional rigidity, the liner panel 22 is provided with a series of ribs 72 which extend perpendicularly to the V-shaped grooves 50 and which serve to strengthen the liner panel 22 and improve its appearance by preventing a vertical wariness in the panel.

The liner panel 22 has outwardly extending side edges 74 and an outwardly extending bottom edge 76. The side edges 74 and bottom edge 76 engage the planer side portions 78 and bottom 80 portions of the tailgate 28. Although the liner panel 22 is held in clamped engagement with the tailgate 28 by the fasteners 26, the underside 82 of the panel 22 is in most places spaced from the surface 38 of the tailgate 28 by the shanks 64 of the fasteners 26 which provide a standoff between the fastener heads 62 and the tailgate surface 38. The holes 84 in the sheet metal surface 28 receive the tapered tapped portion 66 of the screws. However, the shanks 64 are unthreaded and of greater diameter than the holes 84, thus providing a standoff between the tailgate surface 38 and the underside 82 of the tailgate panel 22. The depressed portions 70 which surround the fastener holes in the liner panel provide additional standoff with respect to the top plane 86 of the liner panel 22.

Because the fastener holes 84 in the liner panel 22 are made slightly over-sized with respect to the fastener shanks 64, the panel 22, in the absence of any protrusions or interference with the tailgate itself, is adjustable both in the plane of the tailgate and perpendicular to the tailgate.

The combination of standoff provided by the fasteners 26 and the depressed portions 70 of the liner panel 22 with the opposed tapered surfaces 56, 58 where the cover 20 and the tailgate 28 interface, as shown in FIGS. 5, 6 and 7, results in a tailgate panel upper edge 46 which tightly abuts the lower edge 48 of the tailgate rail cap 40, preventing the formation of a gap therebetween.

It is understood that the invention is not confined to the particular construction and arrangement of parts herein illustrated and described, but embraces all such modified forms thereof as come within the scope of the following claims.

I claim:

1. In a truck having a tailgate with an inner surface having a longitudinally extending depression formed therein, said depression having a ramped sidewall which is inclined toward an upper tailgate rail, and the rail having a protective cap mounted thereon, the cap having a lower edge which projects above the tailgate surface, wherein the improvement comprises:
   a) a thermoformed thermoplastic liner panel which overlies and protects the tailgate inner surface, wherein the panel has an upper edge which is positioned in proximity to the cap lower edge;
   b) portions of the liner panel beneath the panel upper edge which extend outwardly from the panel toward the tailgate surface, the liner extending portions defining a ramped surface which is inclined toward the rail cap lower edge; and
   c) fasteners which extend through the liner panel and engage with the tailgate, such that adjustment of the fasteners brings the liner panel into closer proximity to the tailgate surface, said closer proximity causing the liner panel ramped surface to engage with the tailgate depression ramped side wall to drive the liner panel upper edge into abutment with the rail cap lower edge.

2. The improvement of claim 1 wherein the liner panel extending portions define a V-shaped groove.

3. The improvement of claim 1 wherein each fastener has a threaded portion which engages with the tailgate and an unthreaded shank which extends through the liner panel.

4. A cover for a truck tailgate, the tailgate having an inner surface and an upper rail, and a protective rail cap with a lower edge mounted to the upper rail; the cover comprising:
   a) a thermoformed thermoplastic liner panel which overlies the tailgate inner surface, the panel having portions defining fastener holes, wherein the liner panel has an upper edge for abutting the tailgate rail cap lower edge and at least one protrusion extending toward the tailgate inner surface, the protrusion adapted to engage at least one inclined surface of the tailgate; and
   c) a plurality of fasteners which extend through the fastener holes to join the liner panel to the tailgate, wherein fastening of the fasteners causes the liner panel protrusion to ride down on the inclined surface of the tailgate and advance the liner panel upper edge into closer proximity to the rail cap lower edge, thus positioning the panel upper edge in alignment with the tailgate rail cap lower edge.

5. The cover of claim 4 wherein each fastener has threaded portions beneath an unthreaded shank which is beneath a fastener head, and wherein the shanks are smaller than the fastener holes, and the heads are wider than the holes, and wherein the nonthreaded shanks are of a length greater than the thickness of the liner panel adjacent the holes, and are of a length at least as thick as the threaded portions, such that when a fastener is fully engaged with the tailgate the head stands off from the surface of the tailgate, allowing movement of the cover when affixed to the tailgate.

6. The cover of claim 4 wherein the panel protrusion is a V-shaped groove having a sidewall away from the upper edge adapted to engage with a linearly extending structure of the tailgate.

7. The cover of claim 6 wherein there are three V-shaped protrusions formed in the liner panel, and wherein the panel has portions defining fastener holes between and on either side of the V-shaped protrusions through which the fasteners extend.

* * * * *